United States Patent [19]

De Groot et al.

[11] Patent Number: 5,842,220
[45] Date of Patent: Nov. 24, 1998

[54] METHODS AND APPARATUS FOR EXPOSING MEMBERS OF AN OBJECT CLASS THROUGH CLASS SIGNATURE INTERFACES

[75] Inventors: Michael De Groot, Cupertino; Christopher Brumme, Half Moon Bay, both of Calif.

[73] Assignee: Oracle Corporation, Redwood Shores, Calif.

[21] Appl. No.: 850,688

[22] Filed: May 2, 1997

[51] Int. Cl.$^6$ ...................................................... G06F 17/30
[52] U.S. Cl. ............................................................ 707/103
[58] Field of Search .......................... 707/103; 395/683, 395/702, 703, 710, 712

[56] References Cited

U.S. PATENT DOCUMENTS

| | | | |
|---|---|---|---|
| 5,442,793 | 8/1995 | Christian et al. | 395/683 |
| 5,515,536 | 5/1996 | Corbett et al. | 395/685 |
| 5,613,120 | 3/1997 | Palay et al. | 395/710 |
| 5,644,771 | 7/1997 | Endicott et al. | 395/712 |

*Primary Examiner*—Paul V. Kulik
*Attorney, Agent, or Firm*—Fliesler, Dubb, Meyer & Lovejoy LLP

[57] ABSTRACT

A class signature interface exposes members of an object class in an object oriented software system by exposing access information to the member. The class signature interface has application for use with object models that require client objects to utilize the functionality of server objects through interfaces, such as required by the Component Object Model (COM). Class signature interfaces expose interfaces supported by the object class to provide time constant access to the interfaces of the object class. The class signature interfaces also expose attributes and methods, defined directly on the class level. The class signature interface has further application for use in an object oriented software system to add additional class members to an object class without adding the class members to a separate interface. The class signature interfaces are implicitly generated in an interface definition language (IDL) compiler, or a user specifies the class signature interfaces through the IDL syntax, and the IDL compiler generates the class signature interfaces in accordance with the IDL syntax specified.

43 Claims, 8 Drawing Sheets

METHODS AND APPARATUS FOR EXPOSING MEMBERS OF AN OBJECT CLASS THROUGH CLASS SIGNATURE INTERFACES

BACKGROUND OF THE INVENTION

1. Field of the Invention

The present invention is directed toward the field of object oriented software systems, and more particularly towards techniques for exposing members of an object class defined by an object model that requires implementation through interfaces or abstract base classes.

2. Art Background

An object oriented approach to programming provides many advantages over traditional procedural programming approaches. For example, an object oriented approach permits code reuse through inheritance and modularity through encapsulation. There are many views as to what concepts define object oriented programming, and there are many terms and definitions for defining these concepts. In general, objects incorporate procedures, also called methods or operations, and data, also called attributes or properties. Objects are instantiated from and described by structures known as object classes or types. An object class or type is a general abstract specification, and an object instantiated from an object class is a specific concrete instance of the object class.

An object class consists of an interface and an implementation. The interface comprises variables and function declarations, wherein the variables represent the attributes of the type, and the function declarations specify methods for manipulating those attributes as well as performing other operations. The declaration specifies the name, return type, and arguments, known collectively as the signature. The implementation refers to the actual code that implements the methods specified in the interface. Object classes may consist of abstract classes or implementation classes. Objects are not instantiated from abstract classes. Instead, objects are instantiated from an implementation class.

Typically, the object class for an object defines the methods or operations and attributes or properties for that object. For example, Microsoft®'s Common Object Model (COM), defined as part of the standard Object Linking and Embedding (OLE) technology, defines attributes (i.e., data members) and methods. Specifically, in COM, the object class includes an in-memory table of pointers to the object's methods, referred to as a virtual table (VTBL). Typically, in an object oriented development environment, object classes are compiled and available so that a client object may instantiate an instance of the object from the specification of the object class. However, if a client desires to augment the object class specification, such as adding an attribute or method, then the original object class specification requires modification.

The use of Dynamic Link Libraries (DLLs), which are executable modules called by other programs, are an attempt to at least partially modularize software. The dynamic link library modules are independent. For example, several DLLs may be used in a larger software program, and the DLLs may originate from different software vendors. Due to the independence of each DLL, each software vendor may upgrade its DLL, and the operation of the larger software program should be unaffected.

Typically, object models support inheritance. For example, a derived class, which inherits from a base class, may reference data members and make calls to the base class. However, the derived class and the base class may reside in different DLLs. If the base class DLL is augmented to include additional functionality, then this new base class DLL, which was not compiled with the old derived class DLL, causes several problems.

The difficulty in programming across multiple DLL boundaries using classes in C++ is known as the C++ brittle class problem. For example, if a new data member or attribute is added to the base object class, then the size of the base class changes. In this example, if a derived object, derived from the base class, has not been compiled with the new base class, and it accesses a desired data member in the old base class, then the derived object may really be accessing a different data member. Similarly, if a derived class called a method by obtaining a pointer from the base class VTBL, then a change in the VTBL of the base class may result in the derived class receiving a pointer to the wrong method.

The Component Object Model (COM) solved the C++ brittle class problem by requiring a client of a COM object to add and utilize COM objects through COM interfaces. In general, a COM interface is a list of the operations for working with a class, and it comprises a list of related methods, represented by a pointer to the VTBL of the object class. A pointer in a COM interface points to a table of signatures, where each signature represents a method implemented by an object of the object class. Thus, the client does not have direct access to the object's attributes. A COM interface defines a contract between objects: the object that implements the interface, known as the server object, or simply the object, and the object that uses the interface, called the client object. According to the contract, an object that supports an interface must implement all the methods defined for that interface. When a client object gets a pointer to an interface, it knows what methods it can call, and with what arguments. Because a client must utilize COM objects through use of interfaces only, it is desirable to provide a mechanism that exposes class information for an object on the class level.

In accordance with the COM specification, every COM object must support an interface named IUnknown. Typically, the IUnknown interface has several fundamental methods associated with it, including a QueryInterface method. In general, the QueryInterface method may be invoked, via the IUnknown interface, by other entities to determine whether the object supports a particular interface. The QueryInterface method on the IUnknown interface is then used to access other interfaces supported by that object. Specifically, COM objects interact using a mechanism called interface negotiation. Through interface negotiation, the client object queries the server object to ask it whether it supports a specified interface. If the server object supports the interface, it returns a pointer to that interface. Otherwise, the server object supplies error information in the result code. To illustrate, suppose that object X needs to invoke "interface 20" in object Z. To do this, object X first must determine whether object Z supports interface 20. To accomplish this task, object X invokes the QueryInterface method on object Z's IUnknown interface, and object X passes, as a parameter, the globally unique identifier (GUID) for the "interface 20." In response, the QueryInterface method in object Z searches through an internal list of interfaces that it supports for "interface 20." If interface 20 is found on this list, then the QueryInterface method on object Z indicates that the interface is supported, and supplies a pointer to that interface. With the pointer, object X may invoke methods on interface 20 of object Z.

The method of searching through a list of interfaces that an object supports to determine whether the object supports an interface does work. However, this technique has several drawbacks. First, the list methodology has scalability limitations because the speed of the process depends highly upon the number of interfaces supported by the server object. Because the QueryInterface method on the IUnknown interface searches through a list of supported interfaces, the longer the list of interfaces, the slower the access time for the client object. For example, if an object supports a large number of interfaces, the search time to determine whether an object supports a particular interface may be significant. Because of this practical limitation, there is a limit on the number of interfaces that an object can support without significant performance degradation. Therefore, it is desirable to enable constant time access to the interfaces of an object, regardless of the number of interfaces supported by that object.

The prior art Query Interface method on the IUnknown interface does not allow for early or static binding. In general, static binding is associating or binding the client object's calls to the server object during the compile phase (i.e., prior to run time). For this methodology, static binding is not possible because the client object does not have all the information about the class specification of the server object, including the interfaces that the server object supports. With early or static binding, knowledge of the object's class information may be used advantageously. For example, in true inheritance, a subclass or derived class inherits all the characteristics of its super class or base class, including all of the interfaces. The knowledge of the object class for the base class of a server object may be used advantageously to access an interface of the object more quickly and efficiently. Thus, if a server object belongs to a particular class, then the client object has full knowledge that the server object supports an interface of that class. The prior art methodology of COM interface negotiation does not exploit the object class information of the server object. Instead, knowledge of the interfaces of the server object are not obtained until run time (i.e., dynamic binding). Because of this, no advantage is derived from the knowledge of the server object's class, and therefore no early or static binding. Consequently, it is desirable to expose class information of a server object to derive all benefits of having knowledge of the server object's class information, including the ability to statically bind the client and server objects.

SUMMARY OF THE INVENTION

A class signature interface exposes object class information for an object in an object oriented software system. The object oriented software system includes object classes, defined by an object model, that include at least one class member. Specifically, a class signature interface exposes, for an object class, members of the object class by exposing access information to the member. The class signature interface has application for use with object models that require client objects to implement functionality of server objects through interfaces, such as required by the Component Object Model (COM). In one embodiment, a class signature interface exposes interfaces supported by the object class to provide time constant access to the interfaces of the object class. To accomplish this task, the class signature interface includes an access method for each interface. When invoked, the access method associated with the interface generates a pointer to the associated interface. Because information about class members is exposed through the class signature interface, the class signature interface supports early or static binding.

In a second embodiment, the class signature interfaces expose class member information for attributes defined directly on the class level. For this embodiment, the class signature interface includes access methods, such as "get/set attribute" and "get attribute" methods to expose attributes defined directly on the class level (e.g., attributes that are "hidden" if the class is implemented through COM interfaces only). In a third embodiment, the class signature interface exposes class member methods that are defined directly on the object class. In another embodiment, a class implementation may effectively "emulate" other classes through use of class signature interfaces. For example, an implementation of a first object class may effectively emulate a second object class if a software developer includes, for the first object class implementation, the second object class's class signature interface For this example, the class signature interface of the second object class exposes all members of the second object class.

The class signature interface has further application for use in an object oriented software system to add additional class members to an object class without adding the class members to a separate interface. For this embodiment, the object oriented software system provides a means to define a class signature interface for an object class. Specifically, the user defines class members, such as methods and attributes, and the class members are exposed through the class signature interface via access methods. Thus, through the access methods on the class signature interface, the class members added are effectively exposed on the class level.

In one embodiment, the class signature interfaces of the present invention are implicitly generated in an interface definition language (IDL) compiler. For this embodiment, the IDL compiler generates a class signature interface for each object class, and exposes members of an object class in a pre-defined manner. In another embodiment, the class signature interfaces are specified by a user, through the IDL syntax, and generated by the IDL compiler in accordance with the IDL syntax specified.

DETAILED DESCRIPTION OF THE PREFERRED EMBODIMENTS

The present invention has application for use in an object oriented development environment. In one embodiment, each object class available in the object oriented development environment 100 includes a class signature interface or a signature abstract base class. In general, an interface or abstract base class is a technique for introducing a polymorphic type that can be selectively supported by some object classes in a class hierarchy. For purposes of nomenclature, the term "interface" includes both an "abstract base class" as defined in the C++ programming language, and an "interface" as defined in the Component Object Model (COM) specification. Furthermore, as discussed above in the "Background of The Invention" section, interfaces are used to support implementations of class hierarchies across dynamic link library (DLL) boundaries.

In general, the class signature interface of the present invention provides knowledge of a class and its members. As discussed above, COM interfaces do not expose object class information (e.g., information on the class level). The class signature interface functions to expose class level information. Although the present invention is described for use with the Component Object Model (COM), any object model that requires the use of interfaces or abstract base classes to utilize objects has application for use with the class signature interfaces of the present invention.

Figure 1:
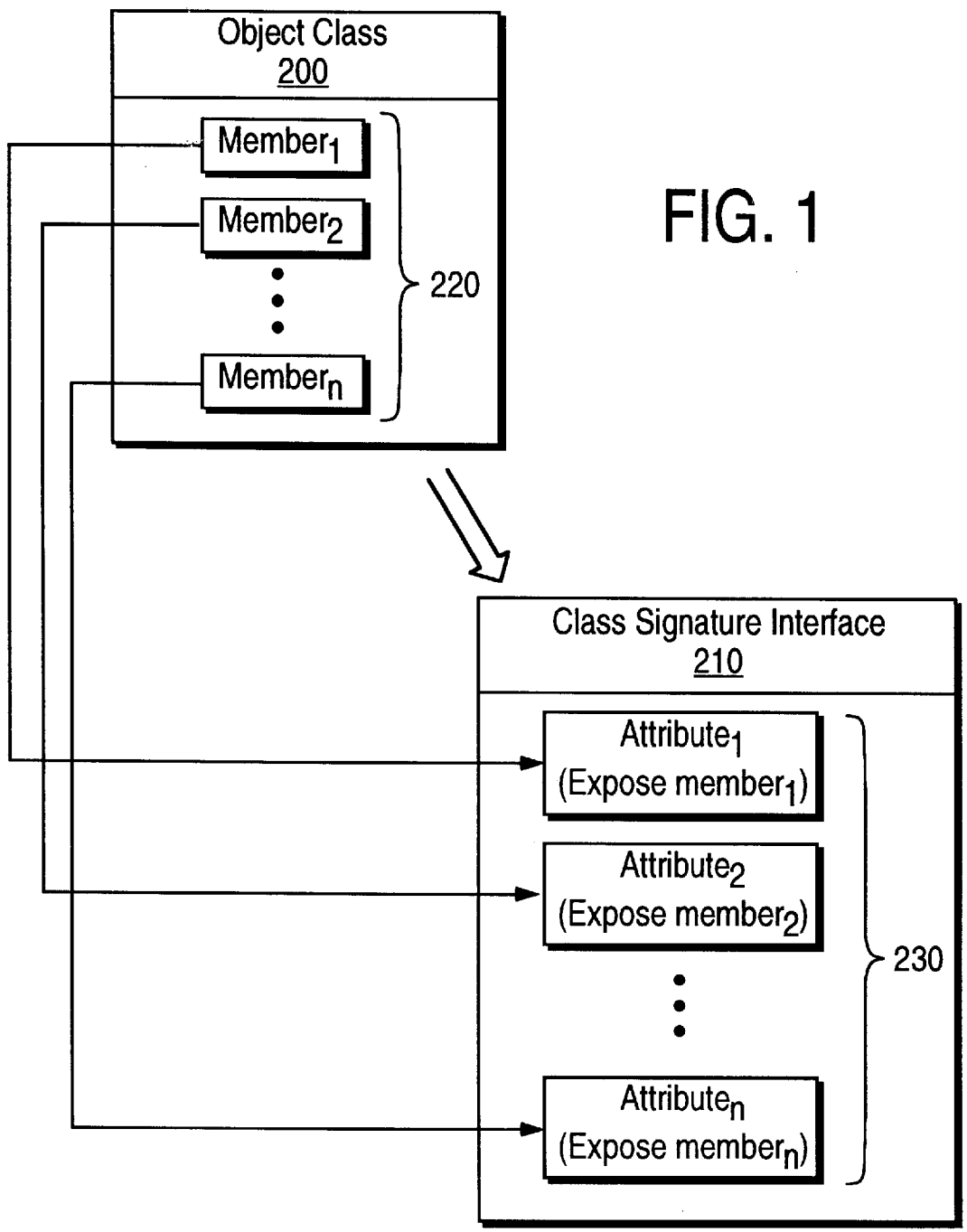
FIG. 1 is a block diagram illustrating one embodiment of exposing object class information through class signature interfaces of the present invention.

FIG. 1 is a block diagram illustrating one embodiment of exposing object class information through class signature interfaces of the present invention. An object class 200, defined by a type system of an object model, includes "n" members, labeled 220 on FIG. 1, (i.e., "n" is any integer value greater than or equal to 1). Objects are instantiated from and are defined by object classes, such as object class 200. For purposes of nomenclature, constituents of object class 200 are referred to as "members" or "types." In general, members of object classes are defined by the type system or type specification for the object model. For example, members 220 may include all types of members defined by the type system including those members typically defined by object models, such as attributes or properties, methods or operations, and interfaces or abstract base classes. Furthermore, members 220 of object class 200 may include members that support object facilities on the type system level. For example, members 220 may support object lifecycles, associations, message passing facilities, names spaces, state models, etc. For purposes of explanation, the present invention is described in conjunction with a type system that includes attributes, methods and interfaces; however, any member (or alias) defined by any object model type system may be exposed by the class signature interfaces of the present invention without deviating from the spirit and scope of the invention. For example, accessor methods may be added to the class signature to support super classes inherited via multiple inheritance, nested classes, backward compatible versions of classes, delegate classes, etc.

As shown in FIG. 1, an object class 200 is associated with class signature interface 210. In general, class signature interface 210 provides a facility to expose members 220 of object class 200. The class signature interface 210 includes a plurality of "attributes" 230. As shown by the lines and arrows on FIG. 1, an attribute 230 of class signature interface 210 exposes a corresponding member 220 of object class 200. Although FIG. 1 illustrates a class signature interface 210 that exposes "n" members 220 of object class 200, any subset of "n" members 220 may be exposed by the class signature interface 210. In one embodiment, the class signature interface exposes members by providing access methods to the members.

Figure 2:
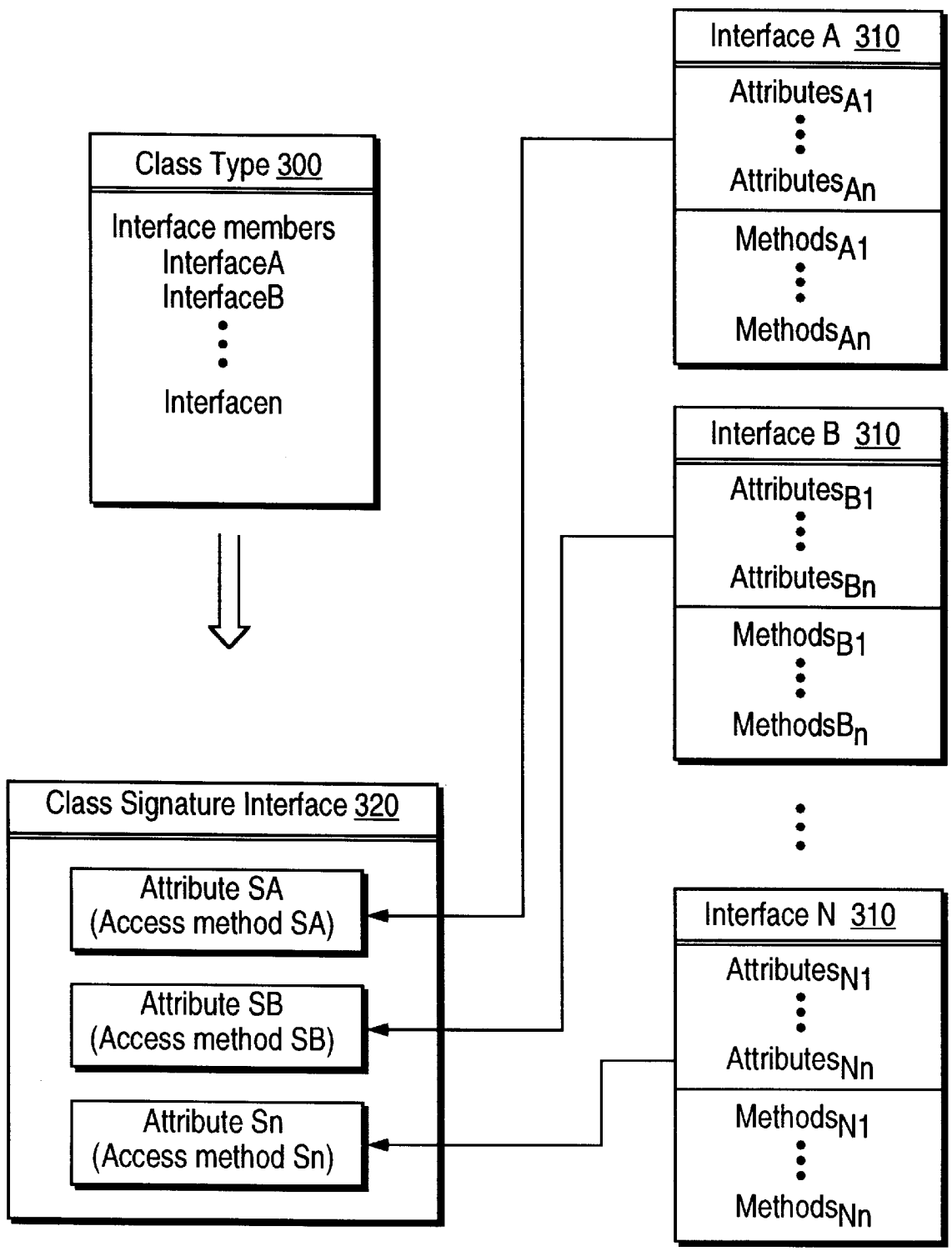
FIG. 2 is a block diagram illustrating one embodiment for exposing object class information via a class signature interface.

FIG. 2 is a block diagram illustrating one embodiment for exposing object class information via a class signature interface. As shown in FIG. 2, an object class 300 supports "n" interfaces, labeled 310, where "n" is any integer value greater than or equal to 1. In one embodiment, object class 300 is defined in accordance with the Component Object Model (COM), and interfaces 310 are COM interfaces. For this embodiment, the COM interfaces 310 expose methods and attributes defined on the respective interface. For example, I_InterfaceA exposes $Attributes_{A1}$—$Attributes_{An}$ and $Method_{A1}$—$Methods_{An}$, and I_InterfaceB exposes $Attribute_{B1}$—$Attribute_{Bn}$, as well as $Method_{B1}$—$Method_{Bn}$.

Similar to FIG. 1, a class signature interface 320 is generated for the object class 300. For this first embodiment, the class signature interface 320 includes "n" attributes, one attribute for each of the interfaces 310 supported by object class 300. In one embodiment, each attribute on the class signature interface 320 exposes one of the corresponding interfaces 310 (e.g., $Attribute_{SA}$ exposes I_$Interface_A$; $Attribute_{SB}$ exposes I_$Interface_B$, and $Attribute_{Sn}$ exposes I_$Interface_n$).

The class signature interface 320, shown in FIG. 2, provides a time constant access to interfaces supported by object class 300. For the first embodiment, the purpose of the class signature interface 320 is to provide fast and efficient access to each of the interfaces 310 supported by the object class 300. In one embodiment, when invoked, the class signature interface 320 provides access to a number of different methods. Each of the methods accessible through the class signature interface 320 provides access to one of the interfaces 310. In general, the methods exposed by the class signature interface 320 provide a pointer to a corresponding interface, to enable fast invocation of methods on each of the interfaces 310. Specifically, to expose one of the interfaces 310 through the class signature interface 320, the class signature interface 320 provides access to a method that returns a pointer to the corresponding interface (e.g., $Attribute_{SA}$ provides access to a method that returns a pointer to I_$Interface_A$; $Attribute_{SB}$ provides access to a method that returns a pointer to I_InterfaceB; and $Attribute_{Sn}$ provides access to a method that returns a pointer to I_InterfaceN).

As discussed above in the "Background of the Invention", COM objects interact via interface negotiation, wherein a client object queries a server object to ascertain whether the server object supports a specified interface. In COM, a QueryInterface method, invoked by the client object, searches through an internal list of interfaces to determine whether a particular interface is supported by the class of the server object. The COM technique is cumbersome and is not scalable. The use of class signature interfaces of the present invention provides time constant access to the interfaces supported by a class. If a client object required knowledge of interfaces supported by a server object, then the client object invokes the class signature interface and retrieves a parameter identifying the desired interface. For example, referring to FIG. 2, if a client object requires I_InterfaceB on object class 300, then the client object simply calls Access $Method_{SB}$. In response, the Access $Method_{SB}$ returns a pointer, which points to the I_InterfaceB, to the client object. Using class signature interfaces, the process of searching a list to determine what interfaces an object supports is eliminated. Because of this, the class signature interface is highly scalable in that this technique provides for constant access time for any number of interfaces.

Figure 3A:
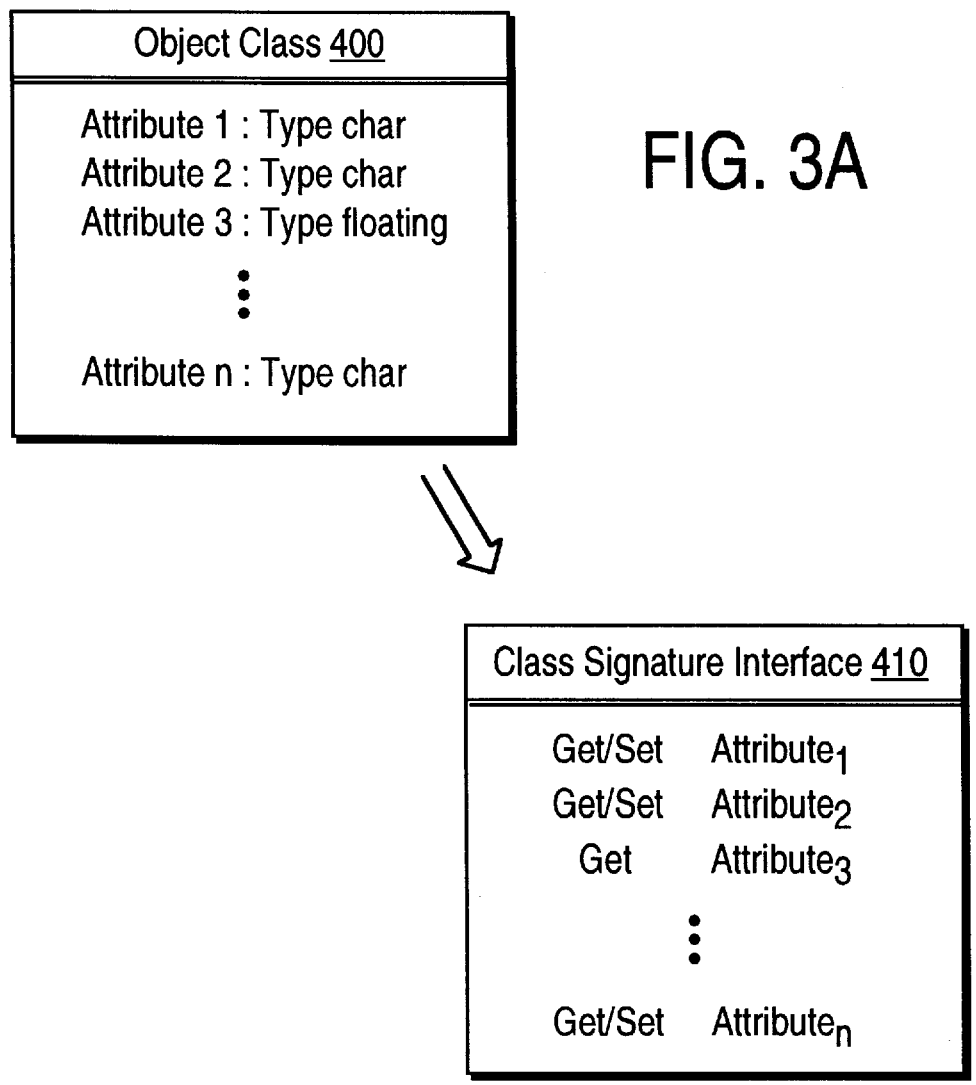
FIG. 3a illustrates a second embodiment for exposing class information of an object through a class signature interface of the present invention.

FIG. 3a illustrates a second embodiment for exposing class information of an object through a class signature interface of the present invention. As shown in FIG. 3a, object class 400 contains a plurality of attributes, labeled attribute$_1$—attribute$_n$. Each attribute has a corresponding type. A class signature interface 410 is generated for the object class 400. For the second embodiment, the class signature interface 410 exposes attributes defined on the class level (e.g., object class 400). For this embodiment, the class signature interface 410 includes a plurality of "get/set" and/or "get" attribute methods. A get/set attribute method permits read/write access to the attributes on the class level 400. A read only attribute is exposed by the class signature interface 410 via a get attribute method (e.g., get attributes). Accordingly, for the second embodiment of a class signature interface, attributes defined on the class level are exposed for access by a client object.

As discussed above in the "Background of the Invention", COM objects expose attributes and methods through interfaces. Thus, attributes and methods defined on the class level are not accessible to the client object. In essence, these object members are "hidden" methods/attributes. With the class signature interface technique of the present invention, class level members, defined in an object model that only exposes members through interfaces, are accessible to client objects. This is useful for type refinement when implementing derived classes, which inherit from a base class, because the implementation is not required to switch between interfaces on the base class and interfaces on the derived class.

Figure 3B:
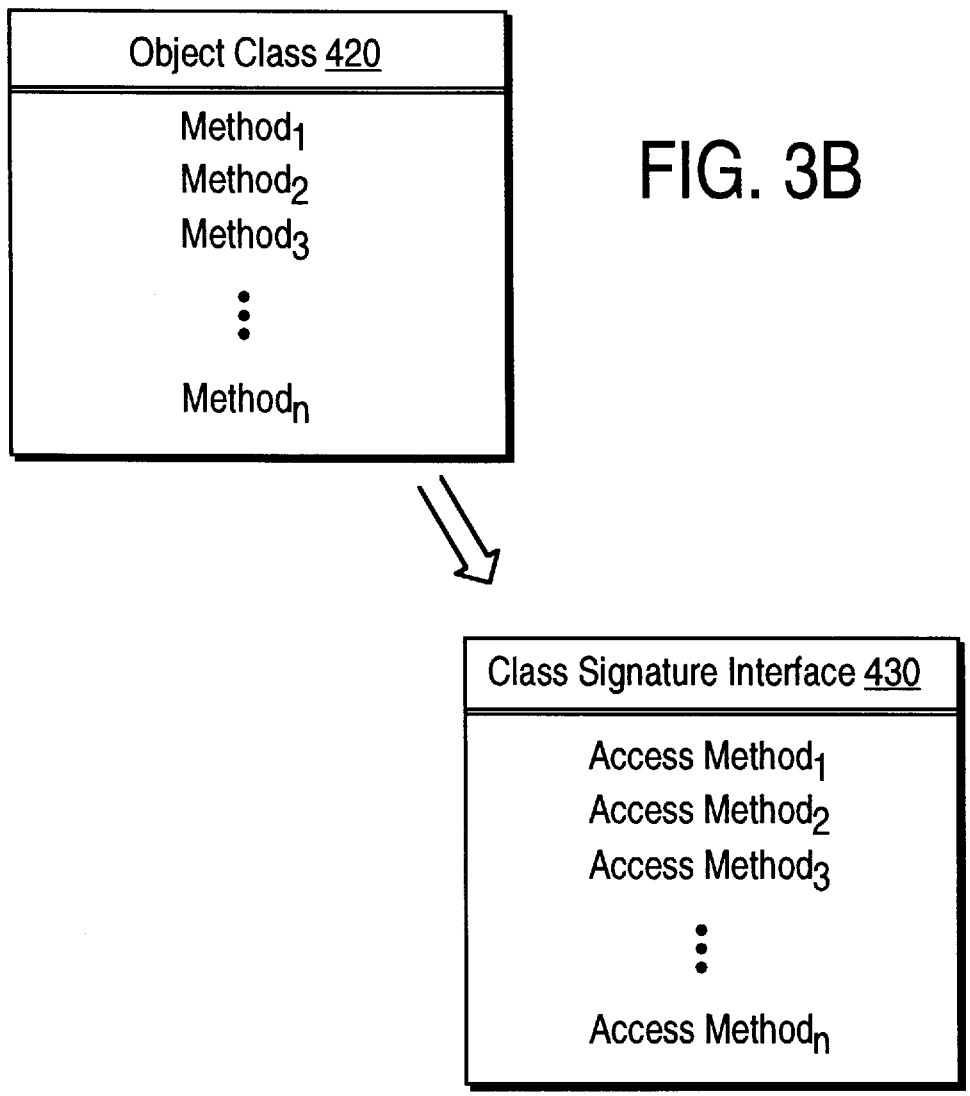
FIG. 3b is a block diagram illustrating a third embodiment for use of a class signature interface of the present invention.

FIG. 3b is a block diagram illustrating a third embodiment for use of a class signature interface of the present invention. As shown in the block object representing class 420, a plurality of methods, "n", are defined directly on the class level. A class signature interface 430, generated for object class 420, includes a plurality of methods that expose the "hidden" methods defined on the class level of object class 420. In one embodiment, access method$_1$, through access method$_n$, each return a pointer to the corresponding method on the class level. Although FIG. 3b illustrates exposing all of the methods on the class level 420 via the class signature interface 430, a subset of the class level methods may be exposed. Exposing only a subset of the methods retains the "hidden" aspect of selected methods (i.e., the client object can not readily access those methods).

Class Signature Interfaces For Adding Members to Object Classes

In object oriented software development, to facilitate code reuse, a programmer may utilize inheritance capabilities of object oriented programming languages. For example, a programmer may desire some functionality provided through an object defined by a base class. To use the functionality, the programmer, through an inheritance technique, creates a new class, such as derived class, that inherits from the base class. Through inheritance, the derived class has all of the features of the base class. With the derived class, the programmer may either override methods and/or add additional methods and attributes to the derived class.

In the Component Object Model (COM), to add a method or an attribute to a class, the programmer adds the attribute or method to an interface that the class supports. Thus, adding methods and attributes to a class in COM requires adding the methods/attributes on an interface of the class, and not directly at the class level. This requires software developers to partition classes into interfaces, and this is typically an awkward approach to model a problem. Thus, the Component Object Model forces software developers to use interfaces in lieu of classes, instead of interfaces in addition to classes. In the MS-"J++" Programming Language, in order to expose attributes via COM, the "accessor methods" exist and reside in an interface. The software developer is not permitted to add any attributes to an object on the class level, but is required to add attributes on an interface that the object class implements. For the example of creating a derived class from a base class, the software developer, when implementing the derived class, may require knowledge of other interfaces on the base class. Thus, if the additional methods/attributes were added on the class level, instead of on an interface, then the additional methods/attributes would be exposed without having to access the interface containing the additional methods/attributes.

The class signature interface of the present invention may be used to add additional members to an object class that are then effectively exposed on the class level. Through use of the class signature interface of the present invention, object oriented software developers may use classes, instead of interfaces, when class use is more desirable. In one embodiment, the class signature interface may contain access attributes and generic methods that the software developer wants available throughout the class implementation. In some circumstances, the use of interfaces is desirable. For example, interfaces or abstract base classes have application to implement polymorphic behavior between an interface and objects that support that interface.

Figure 4A:
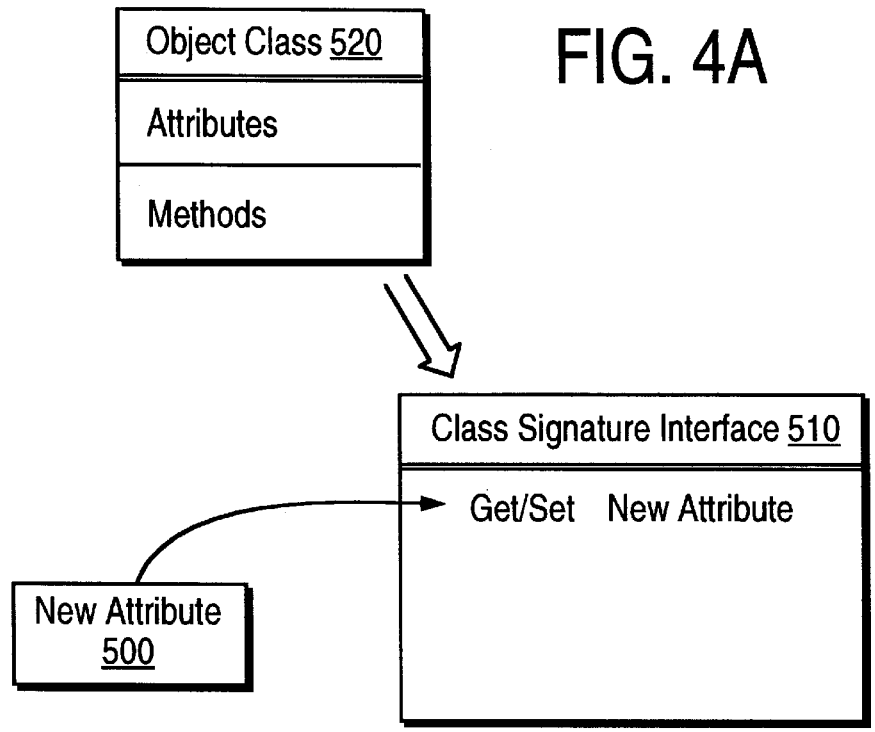
FIG. 4a is a block diagram illustrating the addition of a new attribute to an object class exposed through the class signature interface of the present invention.
Figure 4B:
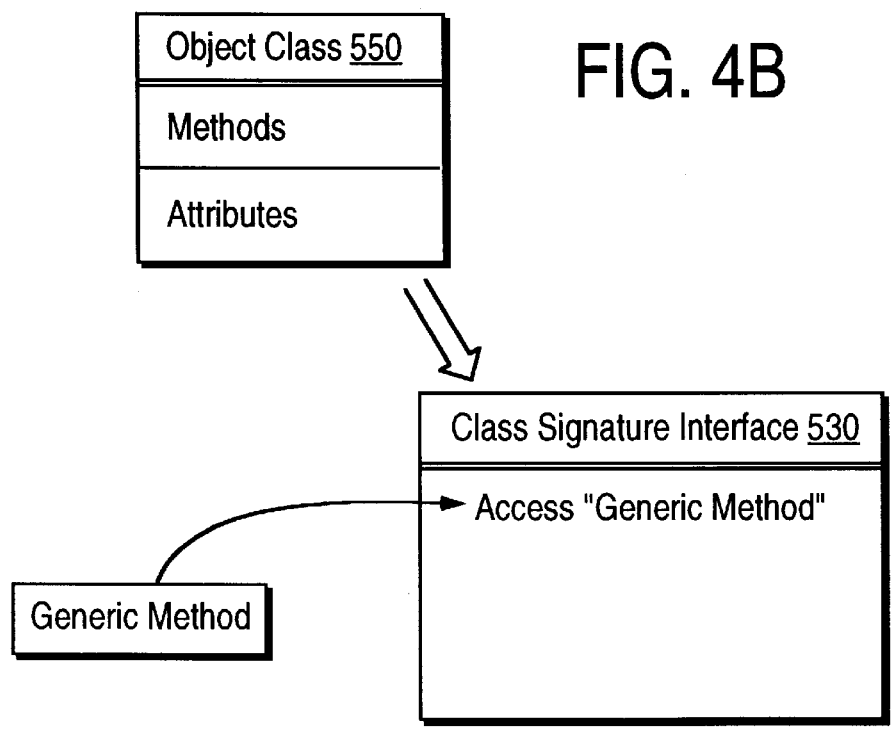
FIG. 4b is a block diagram illustrating the addition of new methods to an object class exposed through the class signature interface of the present invention.

FIG. 4a is a block diagram illustrating the addition of a "new attribute" 500 exposed through the class signature interface 510. Because the get/set new attribute access method exposes the "new attribute" 500, access to the new attribute 500 is available throughout the class implementation of object class 520. FIG. 4b is a block diagram illustrating the addition of methods through use of the class signature interface. A software developer, who desires to add a new method that is accessible throughout the class implementation, adds, for this example, "generic method" to the class signature interface 530 as conceptually illustrated by the arrow on FIG. 4b. Through class signature interface 530, the "generic method" is available throughout the class implementation of object class 550, including at compile time.

Software development using COM objects requires implementing associations among classes within an interface. This forces the implementation to consistently switch among interfaces on a class. Because of this implementation, there is a subtle awkwardness each time the association is used to access interfaces on a class other than the class to which the object is directly associated. The following example illustrates the prior art COM technique to associate two attributes from objects of different classes.

```
Class IB1: IUnknown
{
    Attribute IC2*
association;
}
Class IC1: IUnknown
{
    Attribute IC2*
property;
}
Class IC2: IUnknown
{
```

```
        Attribute IC2*
    property2;
    }
    Class B: IB1, 1B2
    Class C: IC1, IC2
```

In order for the object of class B to refer to the object of class C, some interface on class B must have an attribute associated with an attribute on an interface supported by the object of class C. As a design choice, the selection of an interface to use for the association is arbitrary when all the interfaces must be referenced by the classes implemented. For the example illustrated above, the Class B implementation calls, through the Query Interface method on IUnknown, to access attributes on the IC1 object class.

The following code snippet illustrates an association between attributes of two different classes through use of the class signature interface of the present invention.

```
    Class B: IB1, 1B2
    {
        Attribute C*
    association;
    }
    Class C: IC1, IC2
    C_Signature
    {
        HRESULT GetIC1(ICI**)
        HRESULT GetIC2(ICI**)
        HRESULT
    Getassociation(ICI**)
        HRESULT
    Setassociation(ICI*)
    }
```

For the class signature interface example, the association is made to the implicit class signature interface that contains the attributes being associated. Through use of the class signature interface, when the implementation of the object refers to Class C, it has direct access to all the interfaces on class C without any extra semantic awkwardness or run-time overhead. An implementation of an object of Class B may associate the IC1.property1 as easily as the IC2.property2.

Generating Class Signature Interfaces

In one embodiment, an interface definition language (IDL) compiler is modified to build a class signature interface for one or more classes being defined by the IDL. As is well known in the art of object oriented programming, an interface definition language provides the syntax for a programmer to declare interfaces for a class. In one embodiment, the IDL compiler, which compiles the IDL code, implicitly generates the additional class signature interface in accordance with a predetermined specification. For example, the IDL compiler may generate a class signature interface that exposes all interfaces defined by the IDL syntax for the corresponding class as shown in the example embodiment of FIG. 2. The example below shows the definition of class interfaces for an example class "derived", that inherits from class "base."

```
    Class Derived: Base
    {
        Interface A
        Interface B
        Interface C
    }
```

```
    [Interface S]/Implicit Class
        Signature Interface/
```

For this example, the software developer, through the IDL syntax, declares three interfaces for the base class (i.e., interface A, interface B and interface C). The IDL compiler then generates the class signature interface as follows:

```
    Interface derived signature
    attributes (declared)
    {
        Interface A method
        Interface B method
        Interface C method
    }
```

As shown in the example class signature interface, the attributes on the class signature interface are access methods to each interface defined on Class Derived. In one embodiment, the IDL compiler translates the class signature interface to C++ code to obtain a valid COM interface. In another embodiment, the software developer defines, using the IDL syntax, the class signature interface. The software developer may include, beyond the members exposed through the class interface, additional information. For example, a software developer may specify whether attributes on the class are read only by specifying "get attribute" access methods or whether the attributes are read/write by specifying "get/set attribute" access methods. In one embodiment for generating class signature interfaces, the user specifies class members (e.g., methods, attributes, interfaces, associations, message passing facilities, super classes, delegates, nested classes, etc.) on the class level, and the compiler exposes the class members on the class signature interface. The user may specify, through an interface definition language, any class member for exposure through the class signature interface without deviating from the spirit and scope of the invention. Thus, the class signature interface is a wrapper on the class level.

Class Signature Interfaces To Effectuate Static Binding

The class signature interface of the present invention permits static binding between interfaces and types. In general, static binding or early binding refers to the time when names, such as names for objects or interfaces, are bound to specific types. In static binding, objects are bound to object classes, such as through a type library, at the time the software code is compiled. In contrast, dynamic binding or late binding refers to the technique of binding types to names at run time. In certain situations, it is desirable to implement static binding for code efficiency and speed. For example, the correctness of the program, such as the type compatibility of variables, may be verified as the program is compiled rather than during run time (e.g., as the program is executed by a customer). As discussed more fully below, when a variable is bound to a type during run time (i.e., dynamic binding), a casting operation is required.

As discussed above in the "Background of the Invention" section, programming with interfaces of COM objects prohibit early or static binding as well as require casting operations for all interfaces typed. For example, in COM, the compiler does not have any information about the relationship between the interfaces and the classes that support those interfaces. Thus, early binding is not possible. Furthermore, in the MS-Java "J++" Programming Language, the software developer is not permitted to have the variable type be the name of the class. For example, the operation:

Base X=new Base;
where X is a variable and "Base" is the name of an object instantiated from the base class, is not permitted. Instead, the software developer is required to type only interfaces such as:

IBase X=(IBase) new
where X is a variable and IBase is an interface supported by the base class. For MS Java and COM, objects cannot be typed as classes, only as interfaces to objects. Accordingly, for each interface used, a dynamic casting operation, which requires an inquiry to the server object and a check routine to ensure the cast succeeded, is required.

In general, the class signature interface technique of the present invention provides all the information the compiler requires to bind interfaces to types (e.g., perform static binding). For example, to implement class signature interfaces in conjunction with the Component Object Model, a type library exists that defines the attributes that each type supports. The compiler utilizes the type library to statically bind the interface to types. In one embodiment, the compiler uses the access methods, which generate a pointer to the interfaces, to statically bind the interfaces to the object class. The class signature interface provides a performance advantage in early or static binding because the use of the VTBL in COM or C++. Specifically, the compiler generates code that directly calls through a slot in the VTBL to access an interface in only a few machine instructions rather than performing the costly interface negotiation process described above.

Figure 5:
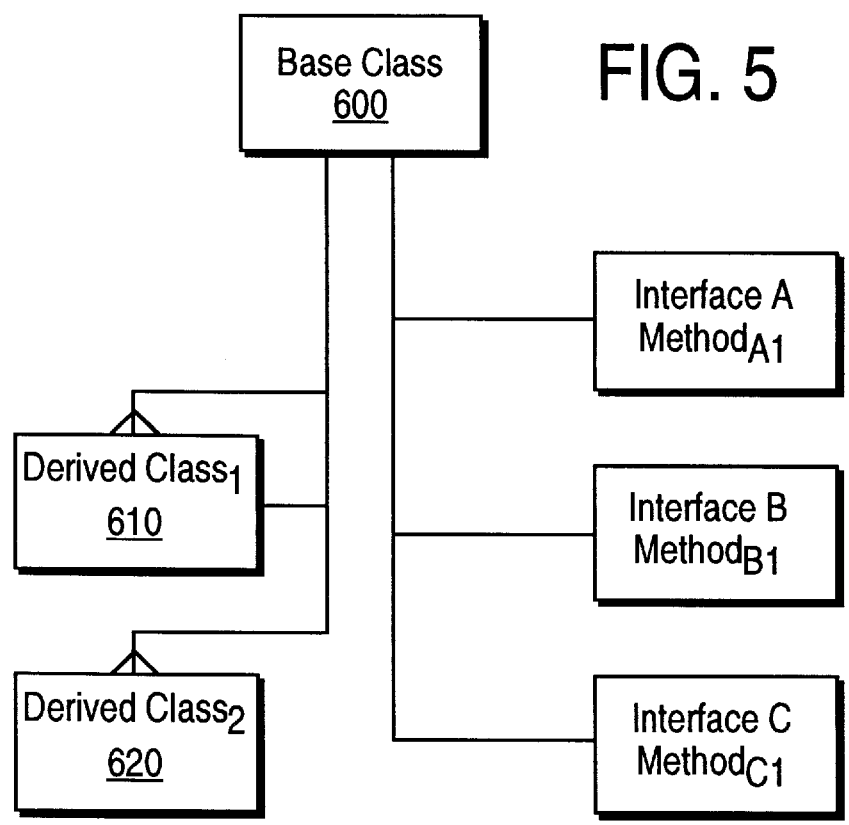
FIG. 5 is a block diagram illustrating a class hierarchy of object class that support multiple interfaces.

FIG. 5 is a block diagram illustrating a simple class hierarchy. A derived class 610 and a derived class 620 both inherit from base class 600. As shown by the lines and arrows in FIG. 5, the base class 600 supports interface A, interface B, and interface C. The derived class 610, which inherits from base class 600, including all interfaces of base class 600, also supports interface A, interface B and interface C. At run time, the derived class 610 may desire to call a method on interface A, interface B or interface C, such as method $_{A1}$ on interface A.

In general, using an "interface only" object model such as COM, a casting operation is required to type a variable to an object or interface. Ideally, using the technique of the present invention, because derived class 610 inherits from base class 600, interface A, interface B and interface C should be available without requiring the programmer to specify a separate casting operation to type a variable to the different interfaces (e.g., interface A, interface B and interface C).

When operating within the Component Object Model (COM), when a software developer creates a new class, such as derived class 610, the software developer declares the class, and then thereafter uses interfaces to call methods and access attributes. For each interface being used, the software developer must declare each individual interface and check whether the underlying class supports that interface. For the example shown in FIG. 5, if a software developer declares the derived class 610, the software developer must further declare interface A to call the method $_{A1}$.

The following "Visual" Basic snippet of code illustrates the required casting operations when working with classes in COM.

DIM a as I_A
DIM c as New Derived
set a=c
if a is nothing then {error}
end if
a.c="Joe"
In the above code snippet, a casting operation is performed to type the variable "a" to interface A (e.g., I_A). The "set a=c" operation is an expensive run time operation because it requires a determination that the derived class 610 supports interface A. The "if/then" statement is a check routine. In the COM casting operation, the "check" is required because the casting cannot take place if the type is incompatible with the variable. The additional "check" step also adds overhead, and subsequently is costly at run time. Furthermore, a change from base class 600 to derived class 610 results in the need to perform an additional dynamic cast when operating with COM. However, if the compiler had information that the derived class inherited from the base class, then the run time cast operation would not be required.

For the example in FIG. 5, if derived class 610 required use of interfaces B and C, then a new casting operation, including the checking operation, would be required for every interface. With the class signature interface of the present invention, a declaration for every interface referenced for a class implementation is not required. With the class signature interface, the compiler receives information that the variable is of the same type as the class. In one embodiment, the compiler obtains the typing information through the class signature interface by calling through methods that access interfaces supported by that class.

The following snippet of code illustrates the use of class signature interfaces for a newly created object.
DIM S as New Derived
S.A.C="Joe"
The derived S_Interface (e.g., class signature interface for the derived class) is set to a variable for the newly derived class. With the signature interface, the software developer may directly reference attributes and methods on an interface without the casting operation. The example snippet of code directly references attribute$_C$ on the I_interfaceA without executing a dynamic casting operation.

In a preferred embodiment, multiple class signature interfaces may be implemented, and although the implementations are different, they are interchangeable. For example, if a software developer implements a product with a class hierarchy, a different developer may re-implement the class hierarchy using the same class signature interfaces, and the code will be replaceable. For this embodiment, the class signature interfaces constitute an abstract type declaration. From an initial class signature interface, subsequent implementations are interchangeable with the original implementation as long as the subsequent implementation supports the abstract type declaration.

In another embodiment, a class implementation may effectively "emulate" other classes through use of class signature interfaces. For example, an implementation of a first object class may effectively emulate a second object class if a software developer includes, for the first object class implementation, the second object class's class signature interface. For this example, the class signature interface of the second object class exposes all members of the second object class.

Object Oriented Development Environment

Figure 6:
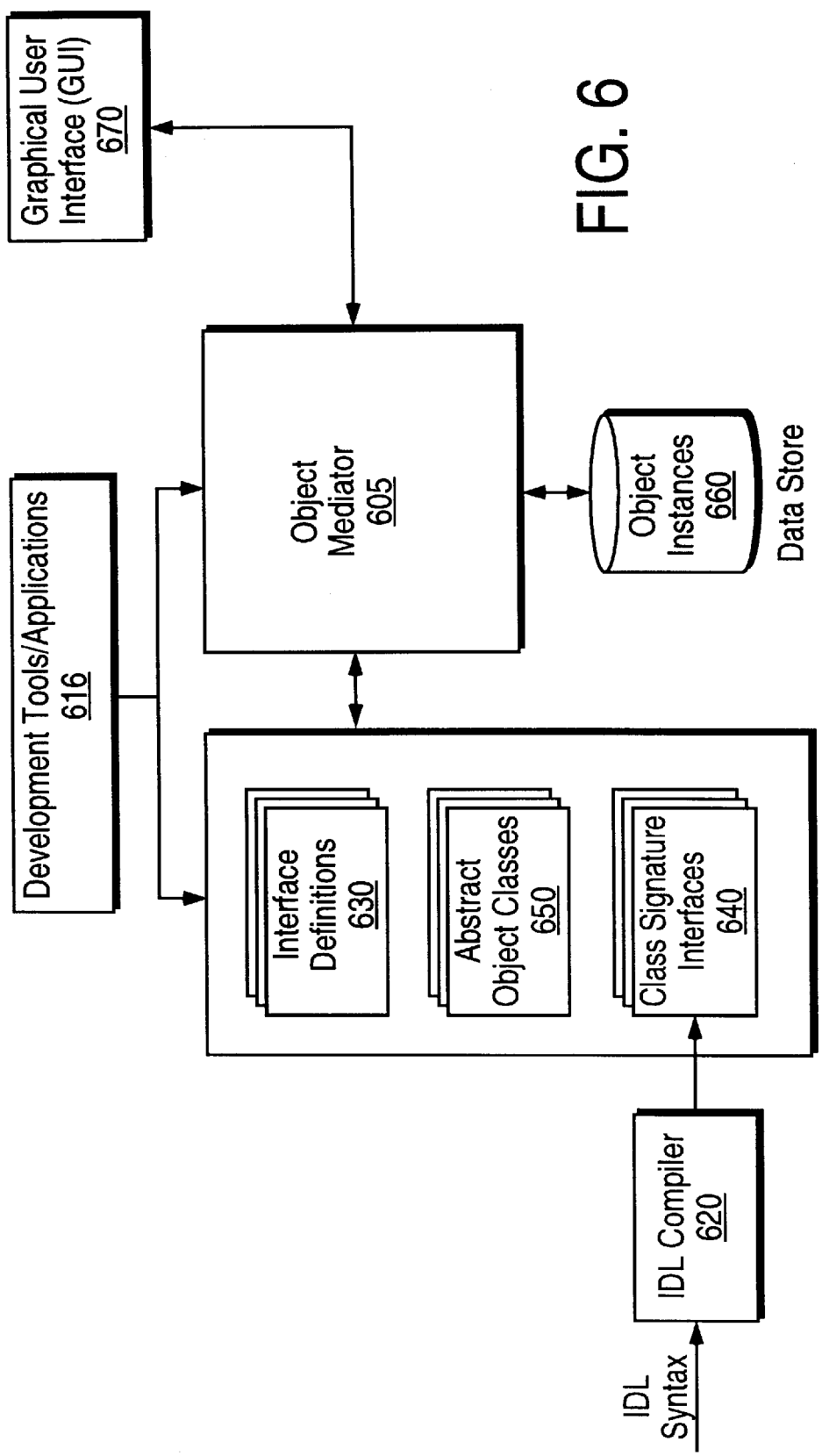
FIG. 6 is a block diagram illustrating an object oriented development environment.

FIG. 6 is a block diagram illustrating an object oriented development environment that incorporates the use of class signature interfaces of the present invention. An object mediator 605 permits users of the object oriented systems to instantiate and manipulate objects. The object mediator 605 operates in conjunction with any number of program development tools, such as CASE tools, and application programs, such as a form building program. The program development tools and application programs are illustrated by the development tools/applications block 610. For this embodiment, the object mediator 605 receives meta data, including interface definitions, 630, class signature interfaces 640, and abstract object class specifications 650. In general, the object mediator 605 permits a user to instantiate client objects from object classes. The object mediator is intended to represent a layer of software that permits a user to manipulate the meta data for use in object oriented programming development. For example, the object mediator 605 may support a C++ programming platform.

As shown in FIG. 6, the object oriented development environment also includes an object store 660. In general, the object store 660 stores object instances defined by the object classes 650 (i.e., objects persist in the object store 660). For example, the object store 660 may comprise an object oriented database or a relational database. The object oriented development environment further includes a graphical user interface (GUI) 670 that permits a user to interface with the object oriented software development environment. The object oriented software development environment 600 further includes an interface definition language (IDL) compiler that generates the class signature interfaces 640. The elements shown in the object oriented software development environment 600, beyond the class signature interfaces and specialized IDL compiler, are those elements typically found in an object oriented development environment, and in facts these elements are intended to represent a broad class of elements found in object oriented developments systems, which are well known in the art and will not be described further.

Computer System

Figure 7:
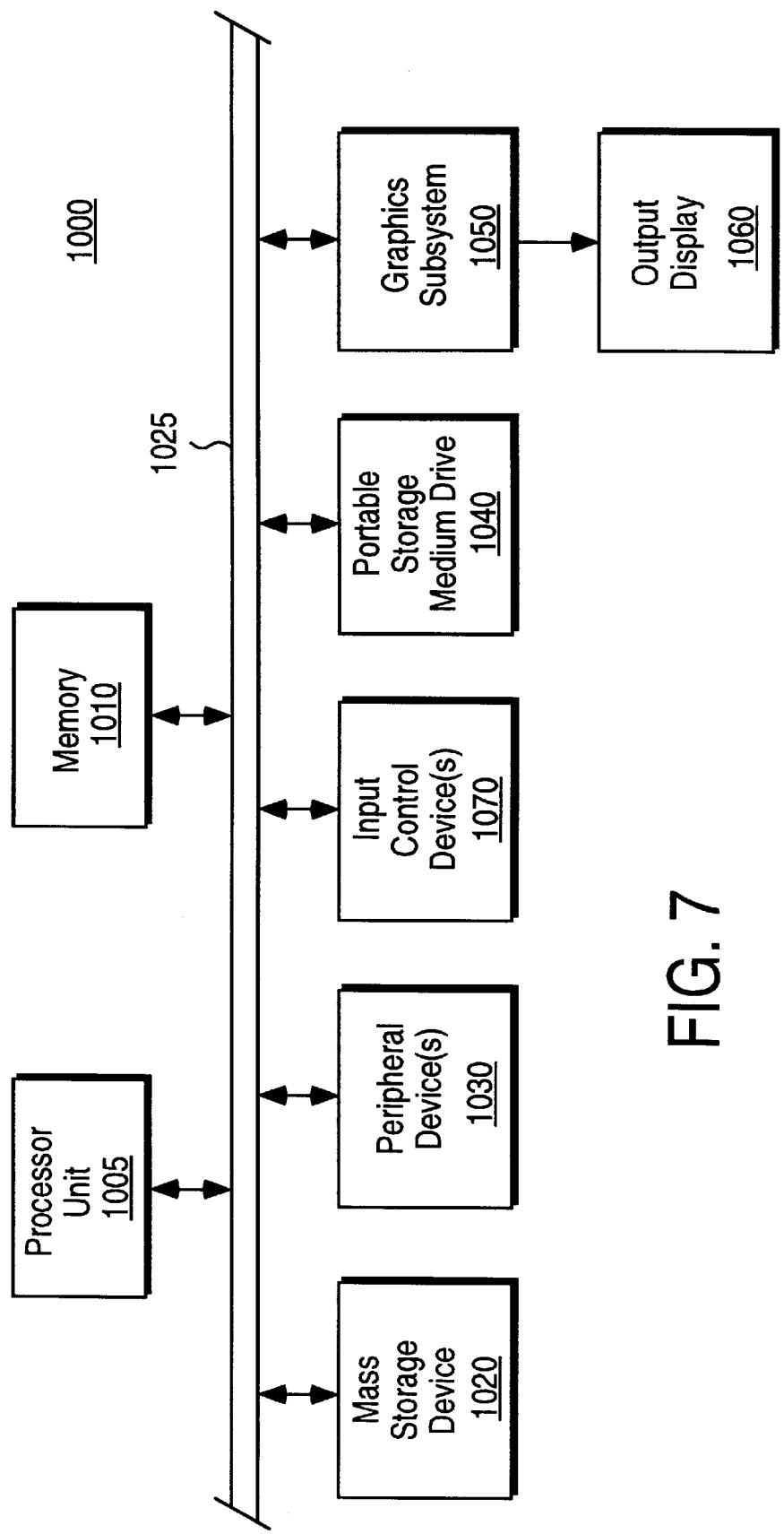
FIG. 7 illustrates a high level block diagram of a general purpose computer system in which the object oriented development system of the present invention may be implemented.

FIG. 7 illustrates a high level block diagram of a general purpose computer system in which the object oriented development system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multiprocessor system. The main memory 1010 stores, in part, instructions and data for execution by the processor unit 1005. The main memory 1010 stores the executable code of the object oriented development system when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 7 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. The mass storage device 1020 stores the object oriented development system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the object oriented development system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The object oriented development system software system is software that includes a plurality of computer executable instructions for implementation on a general purpose computer system. Prior to loading into a general purpose computer system, the object oriented development system software may reside as encoded information on a computer readable medium, such as a magnetic floppy disk, magnetic tape, and compact disc read only memory (CD—ROM). Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method of exposing object class information of an object in an object oriented software system, said method comprising the steps of:

providing, in said object oriented system, a class signature interface for an object class, wherein said object class, defined by an object model, includes at least one member; and exposing, in said object oriented software system, said member of said object class by exposing access information to said member in said class signature interface.

2. The method as set forth in claim 1, wherein said object class is defined by an object model that requires client objects to implement functionality for said objects through interfaces.

3. The method as set forth in claim 1, wherein the step of exposing class information through said class signature interface comprises the step of exposing at least one interface supported by said class.

4. The method as set forth in claim 3, wherein the step of exposing at least one interface supported by said class comprises the step of exposing a method on said class signature interface for said interface, wherein said method, upon invocation, returns a pointer to said interface supported by said class.

5. The method as set forth in claim 1, wherein the step of exposing class information through said class signature interface comprises the step of exposing at least one attribute defined directly on said object class.

6. The method as set forth in claim 5, wherein the step of exposing at least one attribute comprises the step of exposing get/set and get methods on said class signature interface to read/write and read, respectively, said attribute defined on said object class.

7. The method as set forth in claim 1, wherein the step of exposing class information through said class signature interface comprises the step of exposing at least one method defined directly on said object class.

8. The method as set forth in claim 7, wherein the step of exposing at least one method comprises the step of exposing an access method that delegates to said method on said object class.

9. The method as set forth in claim 1, wherein said object class inherits from a base class, and wherein the step of exposing a class signature interface comprises the step of exposing access information to access said base class.

10. The method as set forth in claim 1, further comprising the step of compiling code that includes said object class so as to statically bind interfaces supported by said object class to types.

11. A method for adding members to an object class in an object oriented software system, said method comprising the steps of:

providing, in an object oriented software system, a means for defining a class signature interface for an object class, wherein said class signature interface provides access methods to at least one member of said object class;

receiving at least one member for addition of said member to said object class; and exposing, in said object oriented software system, said member through said class signature interface.

12. The method as set forth in claim 11, wherein the step of exposing said member through said class signature interface comprises the step of providing access methods for said class signature interface at compile time, so that said member is effectively accessible on said object class, whereby members added to an object class are not required to be added to a single interface supported by said object class.

13. A method for exposing class information of an object in an object oriented software system, said method comprising the steps of:

accessing, in an object oriented environment, at least one object class, wherein said object class, defined by an object model, includes at least one member; and generating, for said object class, a class signature interface comprising access information to access said member of said object class.

14. The method as set forth in claim 13, wherein said object class, defined by said object model, requires client objects to implement functionality for said objects through interfaces.

15. The method as set forth in claim 13, wherein the step of generating a class signature interface comprises the step of generating access information for at least one interface supported by said object class.

16. The method as set forth in claim 15, wherein the step of generating access information for at least one interface comprises the step of generating a method on said class signature interface that, upon invocation, returns a pointer identifying said interface.

17. The method as set forth in claim 13, wherein the step of generating a class signature interface comprises the step of generating access information for at least one attribute defined on said object class.

18. The method as set forth in claim 17, wherein the step of generating access information for at least one attribute comprises the step of generating get/set and get methods on said class signature interface to read/write and read, respectively, said attribute defined on said object class.

19. The method as set forth in claim 13, wherein the step of generating a class signature interface comprises the step of generating access information for at least one method defined directly on said object class.

20. The method as set forth in claim 13, wherein said object class comprises a derived class that inherits from a base class, and wherein the step of generating a class signature interface comprises the step of generating access information to access said base class.

21. The method as set forth in claim 20, wherein the step of generating access information for at least one method comprises the step of generating an access method that delegates to said method on said object class.

22. A computer readable medium comprising a plurality of instruction, which when executed by a computer, causes the computer to perform the steps of:

providing, in an object oriented system, a class signature interface for an object class, wherein said object class, defined by an object model, includes at least one member; and exposing, in said object oriented software system, said member of said object class by exposing access information to said member in said class signature interface.

23. The computer readable medium as set forth in claim 22, wherein said object class is defined by an object model that requires client objects to implement functionality for said objects through interfaces.

24. The computer readable medium as set forth in claim 22, wherein instructions for exposing class information through said class signature interface comprise instructions for exposing at least one interface supported by said class.

25. The computer readable medium as set forth in claim 24, wherein instructions for exposing at least one interface supported by said class comprise instructions for exposing a method on said class signature interface for said interface, wherein said method, upon invocation, returns a pointer to said interface supported by said class.

26. The computer readable medium as set forth in claim 22, wherein instructions for exposing class information through said class signature interface comprise instructions for exposing at least one attribute defined directly on said object class.

27. The computer readable medium as set forth in claim 26, wherein instructions for exposing at least one attribute comprise instructions for exposing get/set and get methods on said class signature interface to read/write and read, respectively, said attribute defined on said object class.

28. The computer readable medium as set forth in claim 22, wherein instructions for exposing class information through said class signature interface comprise instructions for exposing at least one method defined directly on said object class.

29. The computer readable medium as set forth in claim 28, wherein instructions for exposing at least one method comprise instructions for exposing an access method that delegates to said method on said object class.

30. The computer readable medium as set forth in claim 22, wherein said object class inherits from a base class, and wherein instructions for exposing a class signature interface comprise instructions for exposing access information to access said base class.

31. The computer readable medium as set forth in claim 22, further comprising instructions for compiling code that includes said object class so as to statically bind interfaces supported by said object class to types.

32. A computer readable medium comprising a plurality of instructions, which when executed by a computer, causes the computer to perform the steps of:
providing, in an object oriented software system, a means for defining a class signature interface for an object class, wherein said class signature interface provides access methods to at least one member of said object class;
receiving at least one member for addition of said member to said object class; and
exposing, in said object oriented software system, said member through said class signature interface.

33. The computer readable medium as set forth in claim 32, wherein instructions for exposing said member through said class signature interface comprise instructions for providing access methods for said class signature interface at compile time, so that said member is effectively accessible on said object class, whereby members added to an object class are not required to be added to a single interface supported by said object class.

34. A computer readable medium comprising a plurality of instructions, which when executed by a computer, causes the computer to perform the steps of:
accessing, in an object oriented environment, at least one object class, wherein said object class, defined by an object model, includes at least one member; and
generating, for said object class, a class signature interface comprising access information to access said member of said object class.

35. The computer readable medium as set forth in claim 34, wherein said object class, defined by said object model, requires client objects to implement functionality for said objects through interfaces.

36. The computer readable medium as set forth in claim 34, wherein instructions for generating a class signature interface comprise instructions for generating access information for at least one interface supported by said object class.

37. The computer readable medium as set forth in claim 36, wherein instructions for generating access information for at least one interface comprise instructions for generating a method on said class signature interface that, upon invocation, returns a pointer identifying said interface.

38. The computer readable medium as set forth in claim 34, wherein instructions for generating a class signature interface comprise instructions for generating access information for at least one attribute defined on said object class.

39. The computer readable medium as set forth in claim 38, wherein instructions for generating access information for at least one attribute comprise instructions for generating get/set and get methods on said class signature interface to read/write and read, respectively, said attribute defined on said object class.

40. The computer readable medium as set forth in claim 34, wherein instructions for generating a class signature interface comprise instructions for generating access information for at least one method defined directly on said object class.

41. The computer readable medium as set forth in claim 34, wherein said object class comprises a derived class that inherits from a base class, and wherein instructions for generating a class signature interface comprise instructions for generating access information to access said base class.

42. The computer readable medium as set forth in claim 41, wherein instructions for generating access information for at least one method comprise instructions for generating an access method that delegates to said method on said object class.

43. A computer system comprising:
memory for storing object oriented system software; and
a processor unit coupled to said memory for executing said object oriented software, to provide a class signature interface for an object class, wherein said object class, defined by an object model, includes at least one member, and to expose, in said object oriented system software, said member of said object class by exposing access information to said member in said class signature interface.

* * * * *